March 24, 1936.  L. E. G. BUEHLER  2,034,858
CHANGE SPEED GEAR SET
Filed Jan. 8, 1934   4 Sheets-Sheet 1
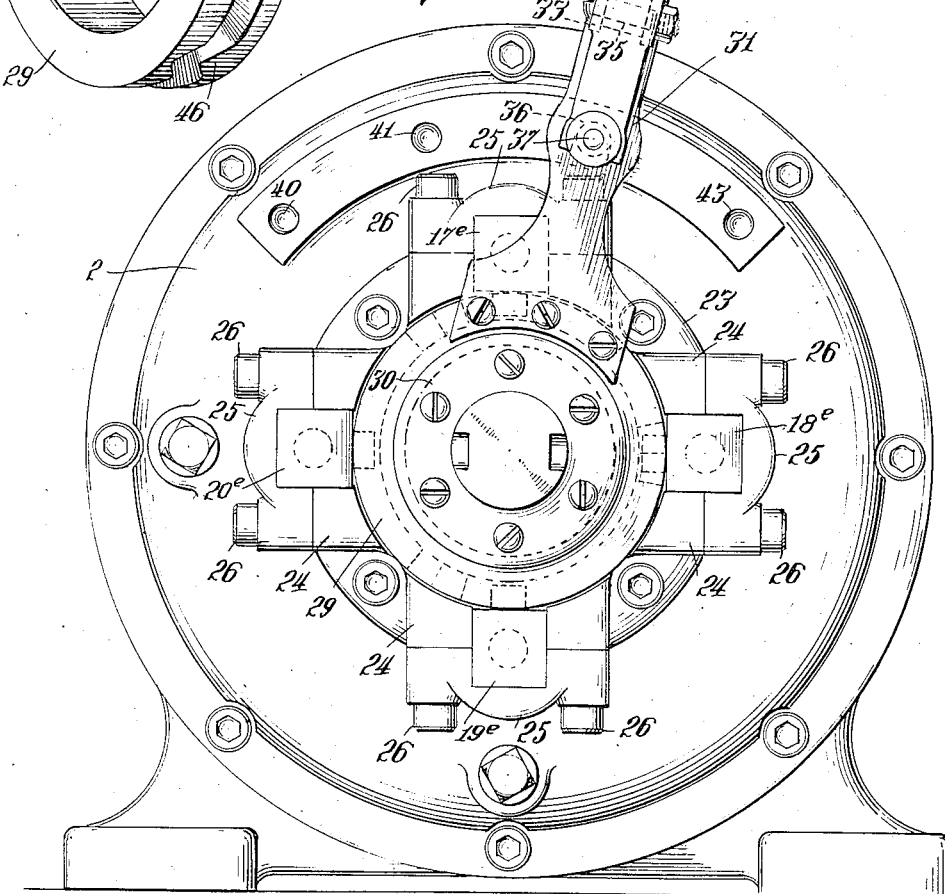

March 24, 1936.  L. E. G. BUEHLER  2,034,858
CHANGE SPEED GEAR SET
Filed Jan. 8, 1934   4 Sheets-Sheet 2
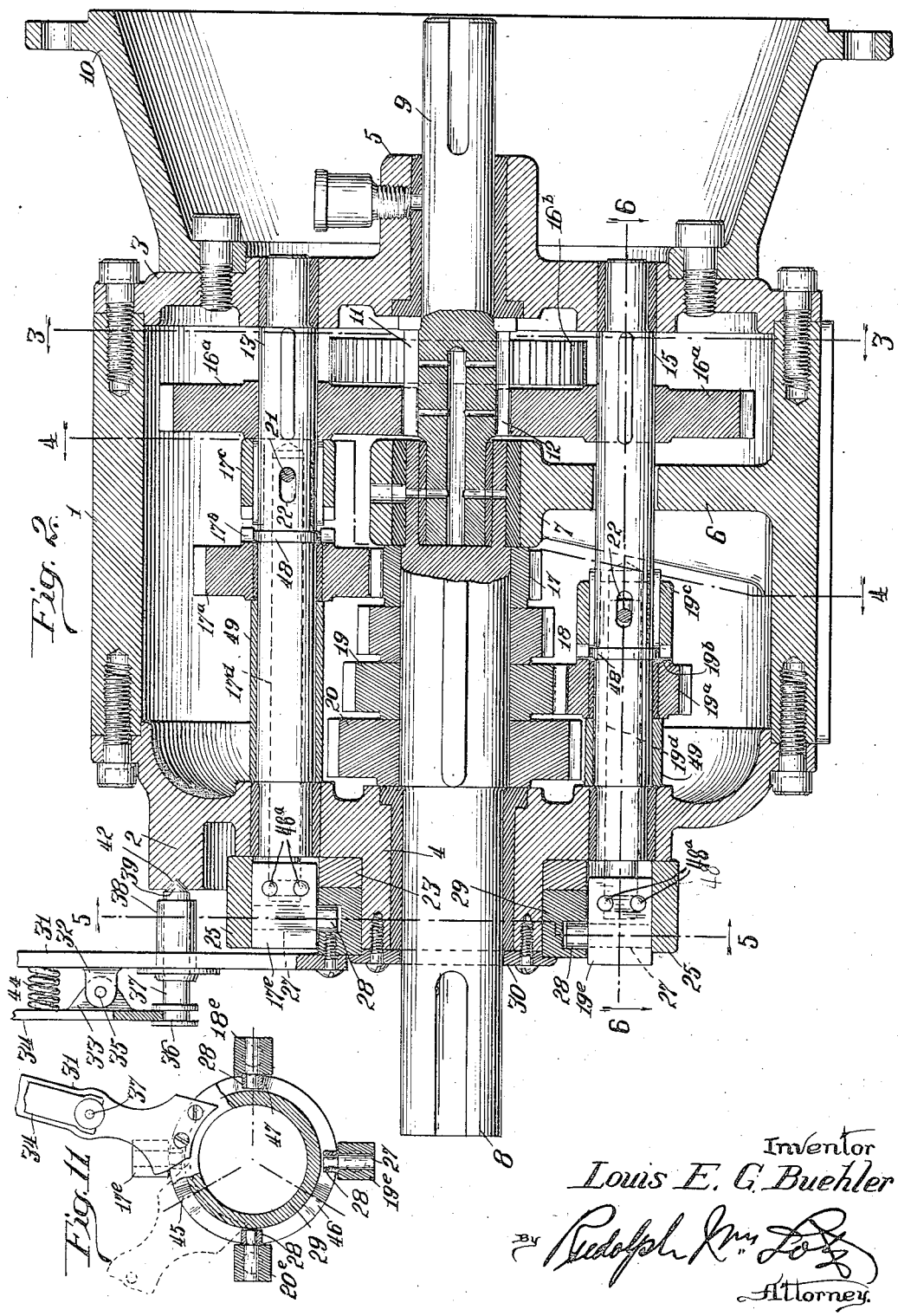
Inventor
Louis E. G. Buehler

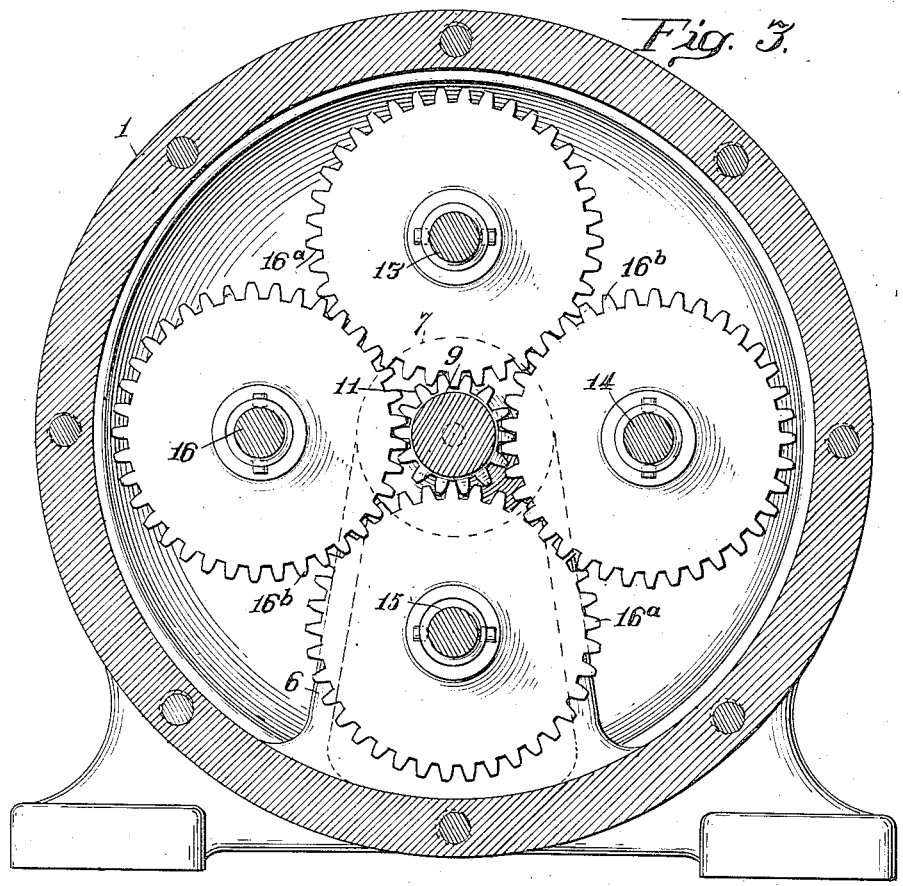
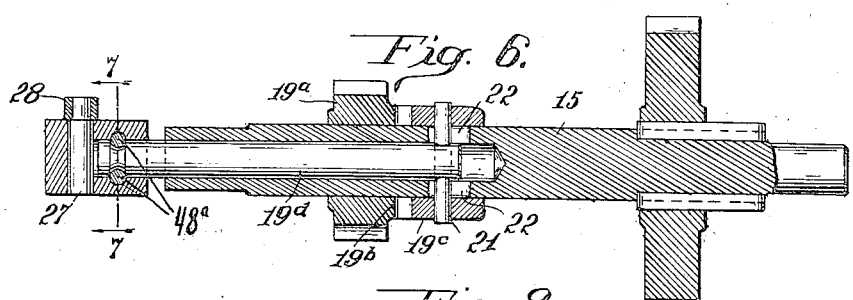
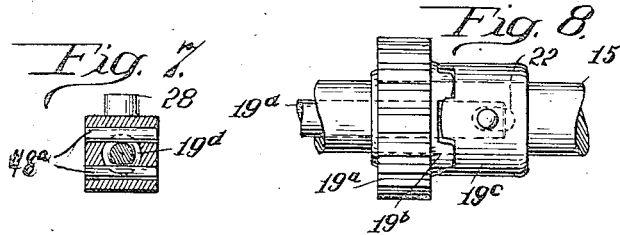

March 24, 1936.  L. E. G. BUEHLER  2,034,858
CHANGE SPEED GEAR SET
Filed Jan. 8, 1934   4 Sheets-Sheet 4

Inventor
Louis E. G. Buehler
By Rudolph Lotz
Attorney.

Patented Mar. 24, 1936

2,034,858

UNITED STATES PATENT OFFICE 2,034,858

CHANGE SPEED GEAR SET

Louis E. G. Buehler, Oak Park, Ill.

Application January 8, 1934, Serial No. 705,692

5 Claims. (Cl. 74—359)

The invention relates to change speed gear sets adapted for use in connection with machinery, automotive vehicles and the like and constitutes a power transmission means for transmitting power from a driven shaft to any one of a plurality of counter-shafts through which the power is transmitted to a shaft to be driven at various speeds or, if desired, also reversely of its normal direction of rotation.

The main object of the present invention is to provide a change speed gear set which is compact and wherein each of the driven elements is selectively and positively associated with and disassociated from the drive shaft by means of clutches of the positive type, such as toothed clutches and by means of a simple manually operable cam.

The invention relates to that type of change speed gear sets wherein the power transmitting intermeshing gears are maintained constantly in mesh, but inoperative to transmit power from the drive to the driven shaft except upon throwing in the proper clutch for causing the selected pair of intermeshing gears to transmit power from the drive to the driven shaft at the desired speed of rotation of the driven shaft relatively to the drive shaft.

Other objects of the invention will be pointed out in, or will be understood from, the following specification:

In the accompanying drawings illustrating a suitable embodiment of the invention:

Fig. 1 is an end elevation of a change speed gear set constructed in accordance with the invention and looking at same from the driven or low-speed shaft end thereof.

Fig. 2 is a central vertical longitudinal section of the change speed gear set.

Figure 4:
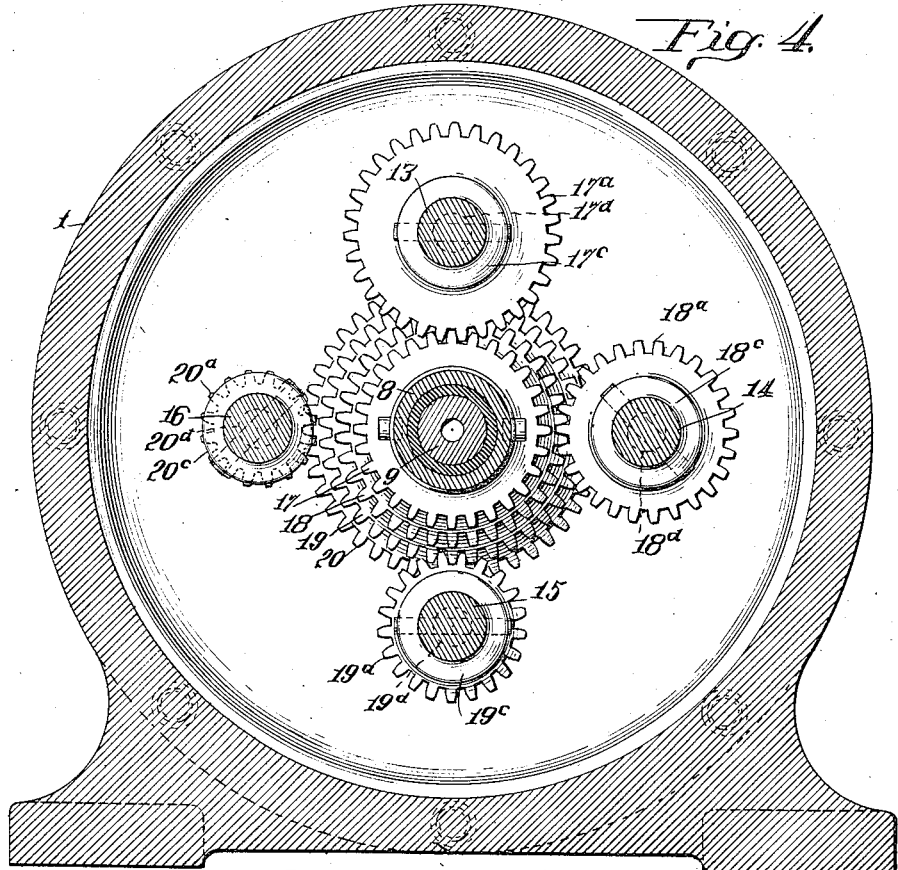

Figs. 3 and 4 are vertical transverse sectional views of the same taken on the lines 3—3 and 4—4, respectively, of Fig. 2.

Figure 5:
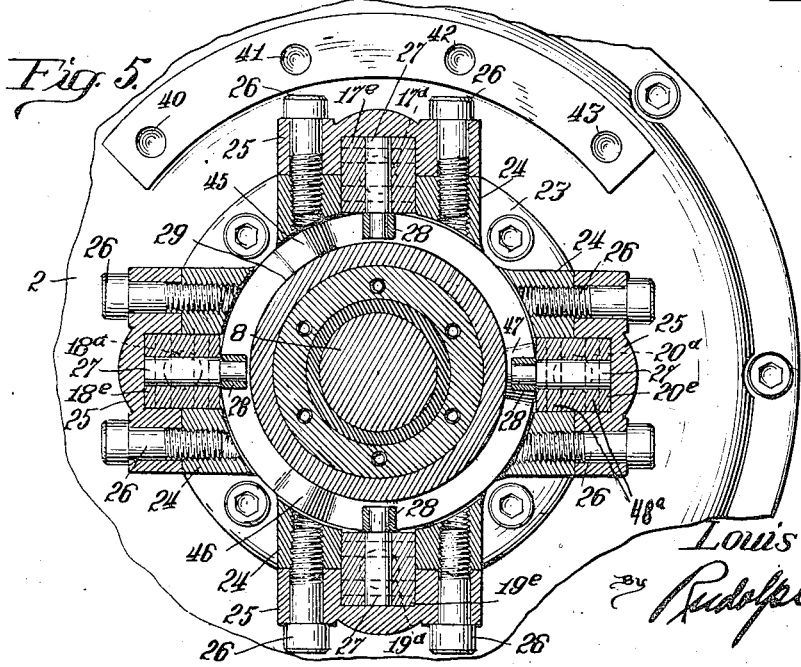

Fig. 5 is a fragmentary vertical transverse section of the same taken on the line 5—5 of Fig. 2.

Fig. 6 is a detail plan sectional view taken on the line 6—6 of Fig. 2, showing a detail of construction.

Fig. 7 is a detail vertical sectional view on the line 7—7 of Fig. 6.

Fig. 8 is a fragmentary detail view in elevation showing one of the gear elements of the mechanism and a tooth clutch used for holding the same against rotation on the shaft carrying said gear element.

Fig. 9 is a perspective view of the rotatable cam employed for controlling the clutches of the mechanism.

Fig. 10 is a developed plan view of the cam shown in in Fig. 9.

Fig. 11 is a diagrammatic detail vertical sectional view of the cam, showing the several clutch actuating plungers engaged therewith.

In the art to which the invention relates, there are two factors of major importance to be considered from the standpoint of commercial value of a change-speed gear set, one being compactness and the other being the length of stroke of the control lever covering the entire range of speed variations of which the gear set is capable, and, hence, the present invention is concerned mainly with a relative arrangement of component elements of the structure whereby the greatest degree of compactness is obtained without sacrifice of any element of thorough practicability and wherein a very short movement of the control lever suffices to throw in any one of the selected clutches. Compactness is effective in reducing weight and cost of the structure, and a short movement of the control lever to effect a change of speed of rotation of the driven shaft promotes speed of operation which is important in the case of industrial machinery equipped with the structure of this invention.

Other factors of importance reside in such an arrangement of the interior mechanism as will permit all of the same to be removed from the casing and restored to the same easily and quickly for purposes of repair and interchange of gear wheels for effecting readjusting speed variations; to provide a structure wherein the several shafts are capable of being made of sufficiently large diameter compared to unsupported lengths between bearings to withstand lateral stresses without bending or flexing and wherein the driveshaft and driven shaft are maintained in accurate axial alignment in such a manner as to reduce stresses and wear on bearings to the minimum.

The mechanism comprises a cylindrical casing 1, which is equipped with removable end walls or heads 2 and 3, respectively, each of which is equipped with a bearing, 4 and 5, respectively, which is concentric or co-axial with the casing 1.

Mounted within the casing and spaced from the head 3 a lesser distance than it is spaced from the head 2, is a support 6 for a bearing 7.

The shaft 8, which is to be driven at varying speed ratios relatively to the drive shaft 9, is journaled in the bearings 4 and 7 and said shaft 8 will be referred to hereinafter as the low-speed shaft. The shaft 9, which will be referred to hereinafter as the drive shaft, or high-speed shaft, is journaled in the bearing 5 and at its inner end is journaled within the hollow end portion of the shaft 8 within the confines of the bearing 7, both shafts thus being journaled at both ends in suitable bearings and eliminating the necessity of equipping the casing, or the heads thereof, with so-called outboard bearings.

The casing, or head 3 thereof, is equipped with a suitable casing 10 for the attachment thereto of the casing of the electric motor which is to drive the high speed shaft 9.

Mounted upon or, as illustrated in the drawings, integral with the drive shaft 9 and located between the bearings 5 and 7 is a pair of spur pinions 11 and 12, respectively.

Arranged around and spaced equidistantly from the axis of the shaft 9 and also equidistantly from each other (in the instance illustrated) are four counter-shafts 13, 14, 15 and 16, respectively, all of which are journaled at opposite ends in bearings in the heads 2 and 3. Each of said shafts is equipped with a spur gear wheel adjacent the head 3, said spur gear wheels being rigid with each of the said respective counter-shafts. The spur gear wheels of the said counter-shafts 13 and 15, indicated at 16a mesh with the spur pinion 11, and the spur gear wheels 16b mounted on the shafts 14 and 16 mesh with the spur pinion 12. Accordingly, during the rotation of the drive shaft 9, the counter-shafts 13 to 16 inclusive, are maintained continuously in rotation.

Mounted rigidly upon the low speed, or driven shaft 8, is a series of spur gear wheels of respectively different diameters as indicated at 17, 18, 19 and 20, respectively, and mounted loosely upon the respective counter-shafts 13 to 16 inclusive, are spur gear wheels which mesh, respectively, with said spur gear wheels 17 to 20 inclusive and which are indicated, respectively, by the reference characters 17a, 18a, 19a and 20a (see Fig. 4).

Rigid, and preferably integral with the respective spur gear wheels 17a to 20a inclusive, are tooth clutch members, each of said members being indicated by reference characters 17b to 20b inclusive.

Slidably mounted upon each of the said counter-shafts 13 to 16 inclusive, is a sliding clutch member adapted for engagement with the clutch member of the spur gear wheel mounted upon said shaft for engaging the latter with its shaft and against rotation relatively thereto. Said sliding clutch members are indicated, respectively, by the reference characters 17c to 20c inclusive.

Extending through each of the respective clutch members 17c to 20c inclusive, is a pin 21, which passes also through a longitudinal slot 22 in the counter-shaft carrying the sliding clutch member, and through reciprocable plungers in the hollow end portions of said counter-shafts 13 to 16 inclusive, said plungers being indicated, respectively, by reference characters 17d to 20d inclusive.

Mounted upon the head 2 is a casting which comprises the hub portion 23 and a set of four pairs of radially extending parallel projections 24, which constitute inner bearing members for the square heads of the respective plungers 17d to 20d inclusive, said heads being indicated, respectively, by the reference characters 17e to 20e inclusive.

Pillow blocks 25 are mounted upon the several pairs of projections 24 by means of the set screws 26, thus confining the said heads 17e to 20e inclusive against rotation and lateral movement.

Mounted in each of the said heads 17e to 20e, inclusive, is a pin 27, which is rigid with or non-rotatably mounted in said head and is equipped with a projecting end portion upon which an anti-friction roller 28 is mounted.

Said pins extend radially of the axis of the casing and of the shafts 8 and 9, respectively, and the rollers 28 thereof engage in the groove of the rocking cam 29, which is mounted rotatably upon the bearing 4 and is confined between the hub 23 of the last named casting and a ring 30, which is secured to the end of said bearing 4.

A lever 31 is rigidly mounted upon the said cam 29 for rocking the same.

The said lever 31 is equipped between its ends with a pair of lugs 32, between which the lug 33 of a trip-lever 34 is received, the said respective lugs being pivotally associated with each other by means of the pivot pin 35.

The said trip-lever 34 engages at its inner end in the annular groove 36 of a reciprocable plunger 37, which is mounted in a bearing 38 integral with the lever 31 and is equipped with a conical end portion 39 adapted to engage in recesses 40, 41, 42 and 43 of an arcuate portion of the head 2, as shown in Fig. 5. A compression spring 44 is interposed between the levers 31 and 34 outwardly of the said lugs 32 and 33 for maintaining the said plunger 37 normally pressed against the head 2, so that it will spring into one of said recesses 40 to 43, respectively, as said lever is moved from one position to the other in rocking the said cam 29, the arrangement being such (as shown in Fig. 1) that upon grasping the lever 31, the operator's hand will embrace the lever 34 and move the same against the action of the spring 44 to cause the plunger 37 to be released from any one of the respective recesses 40 to 43 with which it may be engaged.

The groove of the cam 29 is equipped with three V-shaped portions 45, 46 and 47, which, preferably, are spaced equidistantly from each other circumferentially of the said cam and are arranged so that when an anti-friction roller 28 is engaged in one of said V-shaped portions, the plunger with which said roller is associated will be moved in the direction that will cause the sliding clutch members mounted on the counter-shaft in which the plunger is mounted, to be moved and held in engagement with its companion clutch member of the spur gear wheel carried by said shaft. The arrangement of said V-shaped portions of the cam groove is such that only one of said sliding clutch members may be in engagement with its companion clutch member at any one time and is also such that the cam may be moved to positions wherein all of the sliding clutch members are disengaged from their companion clutch members, the last mentioned positions of the cam being referred to hereinafter as the "neutral" positions thereof.

Owing to the fact that the several plungers 17d to 20d, inclusive, rotate with the respective countershafts 17 to 20, the said heads 17e to 20e, inclusive, are rotatable relatively to said plungers. To this end each of said square heads is provided with a bearing for the outer end of its plunger and each plunger is provided in the portion projecting into such bearing with an annular groove into which the pins 48-A project, such connection being of a well known type and requiring no further description.

Each of the spur gear wheels 17a to 20a, inclusive, is confined between a collar 48 on its shaft and a spacing sleeve 49 which abuts at one end against the head 2 of the casing.

The foregoing specification is directed to the specific construction illustrated in the drawings wherein four counter-shafts 13 to 16, inclusive, are shown, it being understood of course that the number of said counter-shafts may be varied to adapt the structure to the particular use for which it is intended. This applies also to the number of sets of intermeshing gear wheels employed which must, necessarily, correspond to the number of said counter-shafts.

In certain instances it is desirable to provide a means for causing the shaft 8 to rotate reversely of the shaft 9 at either a low-speed or any selected other speed relatively to those speeds at which said shaft 8 is rotated in the same direction as the shaft 9. To this end as, for example, in the case of the shaft 13 and the gear wheels 17 and 17a, respectively, the reversal of rotation of the shaft 8 may be accomplished by reducing the diameter of the spur gear wheel 17a so that it will clear the spur gear pinion 17 and suitably introducing an idle gear meshing with both said gears in a well known manner.

The same is true also of the gear wheel 20 and the spur gear wheel 20a meshing therewith, in which event the reversal of rotation of the shaft 8 will be at lower speed than in the case of the suggestion with respect to the gear wheels 17 and 17a.

The foregoing modifications will be readily understood by persons skilled in the art without other or further description or illustration.

One of the objects of the present invention is to cause the shaft 8 to be rotated at successively higher and, vice versa, lower speeds as the lever 31 is moved from one position to another through the entire arc of its movement. Reference being had to Fig. 11, it will be noted that the lever 31 is shown in one position in dotted lines and when disposed in that position, a V-shaped portion of the groove of the cam will have caused the plunger 20e to have moved the sliding clutch member 20c of the shaft 16 into engagement with the clutch member of the spur gear 20a which meshes with the spur gear 20 of the shaft 8, thus driving the latter at the lowest of the several speeds indicated. By moving said lever to the position shown in full lines in Fig. 11, a V-shaped portion of the cam groove will have moved the plunger 19d to cause the sliding clutch member 19c to engage its companion clutch member and thus cause the shaft 8 to be rotated at the next higher speed. When said lever 31 is disposed in a position between the two positions indicated in Fig. 11, all of the V-shaped portions of the cam groove will be disengaged from the anti-friction rollers 28 and thus the mechanism will be in neutral position wherein no power is transmitted to the shaft 8.

By moving the lever 31 still further in the direction indicated above, a V-shaped portion of the cam groove will have thrown the sliding clutch member 18c into engagement with its companion clutch member and thereupon the low-speed shaft will be rotated at the next to its highest speed, and, by moving the lever 31 still further in the same direction, a V-shaped portion of the cam groove will have thrown the clutch member 17c into engagement with its companion clutch member to cause the shaft 8 to be driven at its highest speed.

Reversal of the aforesaid successive movements of the lever 31 will cause the shaft 8 to be rotated successively at the various speeds above indicated and when said lever is disposed so that the plunger 39 is positioned to the left of the recess 40 shown in Fig. 1, the mechanism will be in a neutral state exactly as it is when the said plunger 39 is disposed between any pair of the several recesses 40 to 43 inclusive.

The arrangement is such that the cam and the lever 31 enable the toothed clutches to be disengaged very readily under the heaviest load conditions of the mechanism and also cause the said clutches to be held securely in inter-engaging relation and against possibility of disengagement from each other due to a slight taper of the inter-engaging or radial surfaces of the teeth of the respective clutch members, said taper being from about 5° to 15° to facilitate disengagement, as shown in Fig. 8. It will be noted also that the crowns of the teeth of the inter-engaging clutch members are rounded to facilitate smooth operation and prevent chipping and breaking of corner portions as commonly occurs in the case of sharp-cornered clutch teeth.

I am aware that the relative arrangement of drive-shaft, driven-shaft, countershafts and intermeshing gear-wheels illustrated in the accompanying drawings is old in the art, as are also positive clutches for selectively associating the countershafts with the driven shafts, and, therefore, in the following claims the opening statement—"In a change-speed gear set of the type shown and described"—will include all of the elements set forth in this paragraph and that which I believe to be novel in the art follows said opening statement.

I claim as my invention:—

1. In a change-speed gear-set of the type herein shown and described, reciprocable plungers extending through hollow end portions of the several countershafts, cross-heads connecting said plungers with the slidable clutch members through longitudinal slots in said countershafts, non-rotatable bearing-heads for the outer-ends of said plungers, means for holding said heads against longitudinal movement relatively to said plungers, bearings in one of the casing heads for said bearing heads, a projection on each of the latter, a rocking cam rotatably mounted on a casing head and engaged with said projections, said cam equipped with formations arranged relatively to said plungers for throwing in any selected one of said sliding clutch members and throwing out the remainder thereof precedent to such throw-in.

2. In a change-speed gear-set of the type herein shown and described, reciprocable plungers extending through hollow end portions of the several countershafts, cross-heads connecting said plungers with the slidable clutch members through longitudinal slots in said countershafts, non-rotatable bearing heads for the outer-ends of said plungers, means for holding said heads against longitudinal movement relatively to said plungers, bearings in one of the casing heads for said bearing heads, a projection on each of the latter, a rocking cam rotatably mounted on a casing head and engaged with said projections, said cam equipped with formations numbering one less than said countershafts and arranged relatively to the latter for throwing in all of the sliding clutch members successively by rotating said cam through an arc approximately ninety degrees.

3. In a change-speed gear-set of the type shown and described wherein the several countershafts are spaced equidistantly from each other, a manually operable rocking cam mounted on the casing co-axially with the drive-shaft, reciprocable plungers engaged with the several respective sliding clutch-members of the countershafts, means operatively engaging the said plungers with the said cam for throwing said clutches in and out, said cams equipped with formations numbering one less than said countershafts and spaced from each other so that all of said sliding clutch members will be thrown in successively by rotating said cam through an arc not exceeding ninety degrees and each thereof thrown out precedent to throw-in of the next succeeding clutch member.

4. In a change-speed gear-set of the type shown and described wherein the several countershafts are spaced equidistantly from each other, plungers extending axially of the several respective countershafts and having sliding key connection with the latter and rigid connection with the sliding clutch members, non-rotatable bearing heads on said plungers, means for preventing movement of said heads longitudinally of said plungers, bearings for said heads mounted on an end wall of the casing, projections on said heads extending radially toward the drive-shaft, a rocking cam mounted on said casing wall co-axially with the drive-shaft and engaging said projections, means for holding said cam against axial movement relatively to the casing, said cam equipped with formations numbering one less than said countershafts and spaced from each other so that all of said sliding clutch members will be thrown in successively by rotating said cam through an arc not exceeding ninety degrees and each, thereof, thrown out precedent to throw-in of the next succeeding clutch member.

5. In a change-speed gear-set of the type shown and described herein, clutch throw-in and throw-out mechanism comprising a rocking-cam rotatably mounted on the casing and held against other than rotary movement and equipped with clutch throw-in and throw-out formations numbering one less than the number of countershafts of the gear-set, and reciprocable plungers operatively connecting said cam with the several respective clutches of the gear-set, said cam adapted to throw in said clutches successively during rotation in one direction and said formations thereof relatively arranged and shaped to throw-out each clutch precedent to throw-in of another thereof.

LOUIS E. G. BUEHLER.